July 28, 1931.   A. M. TROGNER   1,815,938
FLUID FLOW CONDUIT
Filed May 20, 1930   2 Sheets-Sheet 1
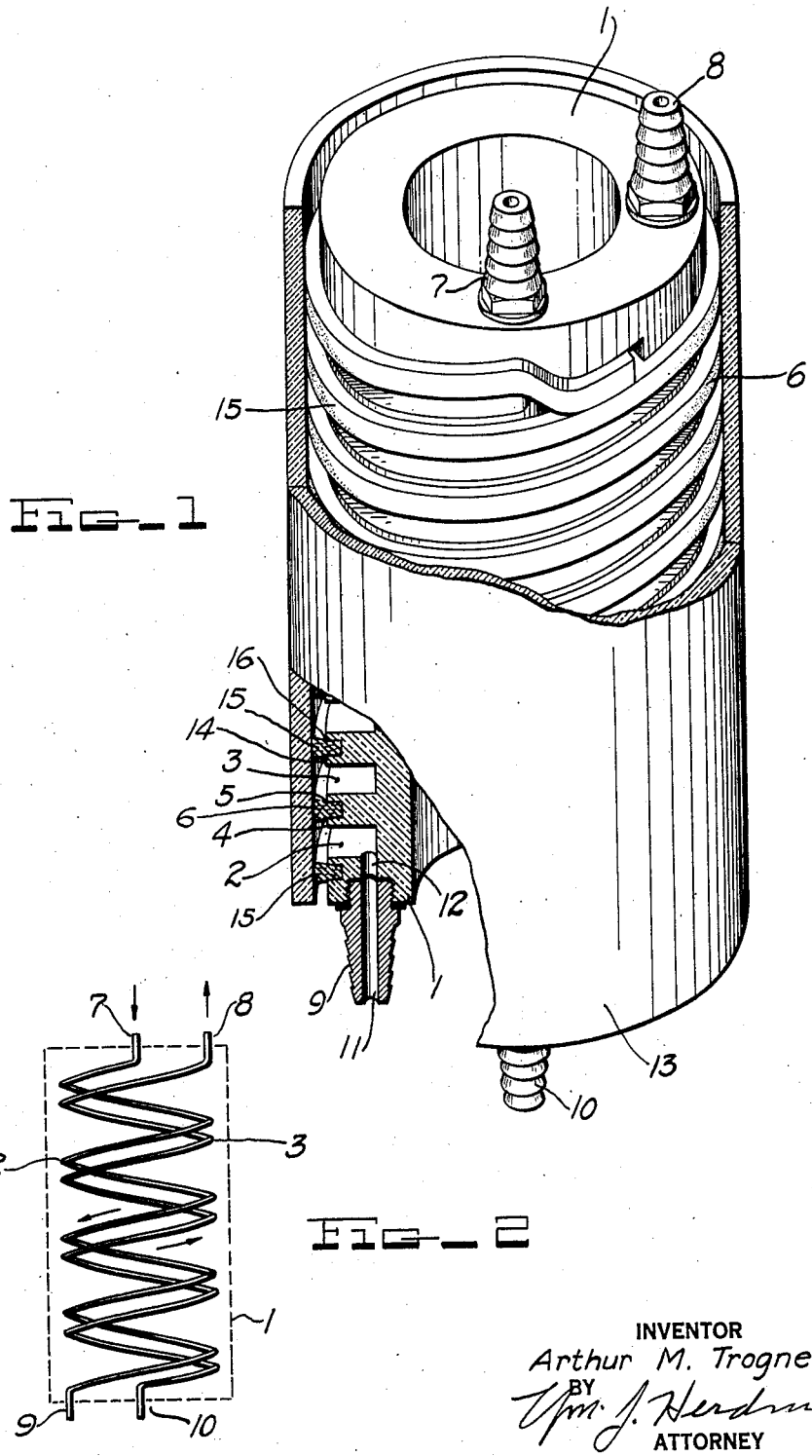
INVENTOR
Arthur M. Trogner.
BY
ATTORNEY July 28, 1931.  A. M. TROGNER  1,815,938
FLUID FLOW CONDUIT
Filed May 20, 1930  2 Sheets-Sheet 2
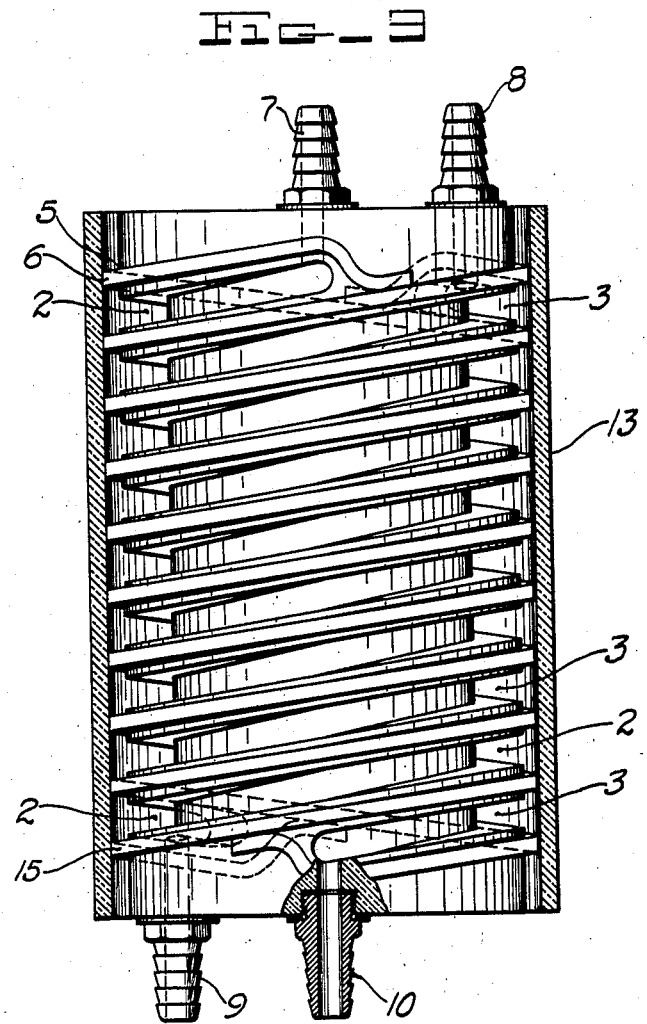
Fig_3
INVENTOR
Arthur M. Trogner.
BY
ATTORNEY Patented July 28, 1931

1,815,938

UNITED STATES PATENT OFFICE

ARTHUR M. TROGNER, OF MAPLEWOOD, NEW JERSEY, ASSIGNOR TO WIRED RADIO, INC., OF NEW YORK, N. Y., A CORPORATION OF DELAWARE

FLUID FLOW CONDUIT

Application filed May 20, 1930. Serial No. 454,168.

My invention pertains in general to electron discharge apparatus and specifically relates to fluid flow conduits employed with fluid cooled electron discharge devices used in high power radio transmitting.

In the use of electron discharge devices of the fluid cooled exterior anode type, it is essential to provide a relatively high resistance along the line of fluid flow away from the anode. This has heretofore been usually accomplished by providing a considerable length of rubber hose through which the cooling fluid may pass, the hose being of sufficient length to insure sufficiently high resistance between the anode of the transmitting tube and ground through the fluid. However, rubber hose is subject to rapid deterioration and can easily be ruptured. To avoid these difficulties, glass tubing has also been heretofore used as a fluid flow conduit and as a substitute for rubber hose. Although the glass tubing provides a highly resistive line of flow and is not subject to deterioration, it may be damaged by mechanical shocks and vibration.

One of the objects of my invention consists in providing an efficient fluid flow conduit adapted to establish a relatively high resistance along the line of fluid flow extending from the exterior anode of a high power electron discharge device and which is of non-fragile and highly durable construction.

Another object consists in providing a compact construction of fluid flow conduit which can be quickly and easily assembled and installed in a radio transmitter.

I accomplish the above desirable objects in a novel fluid flow conduit in which a double threaded member is provided within a cylindrical casing.

In the drawings accompanying and forming a part of the specification and in which like reference numerals designate corresponding parts throughout:

Fig. 1 is a perspective partially sectioned view of one embodiment of the fluid flow conduit of my invention.

Fig. 2 is a schematic representation of the lines of flow through my fluid flow conduit.

Fig. 3 is a partially sectioned front elevation of the embodiment of Fig. 1.

Referring to Fig. 1, a cylindrical member 1, preferably composed of a ceramic material, is formed to provide two exterior helical channels 2 and 3. The shoulders 4 and 14 separating the two channels 2 and 3, which are integral with the member 1, are formed to provide two relatively smaller channels 5 and 16 which are co-extensive with the channels 2 and 3. Two elongated gaskets 6 and 15 are disposed within the channels 5 and 16 in a manner more fully described later.

Referring to Fig. 3, two outlet connections 7 and 8 are secured to one end of member 1 and two outlet connections 9 and 10 are secured to the other end of the member 1. In Fig. 1, the sectional view of outlet connection 9 shows how the same is threaded into the member 1. A hole 11 extending through the connection 9 meets another hole 12 extending through the wall of the member 1 into the channel 2.

The other outlet connections are similarly secured to the member 1 as shown in Fig. 3. The connection 7 forms another outlet for the channel 2, while the connections 8 and 10 provide outlets for the channel 3. These connections 7, 8, 9 and 10 are provided with exterior flanges so that a water-tight seal can be made with rubber hose which could extend in one direction to the electron discharge tube, and in the other direction, to the fluid pressure source.

The member 1 and the gaskets 6 and 15 are disposed within a cylindrical container 13 which compresses the gaskets 6 and 15 to form water-tight seals along their contact surfaces. It will be evident, then, that the gaskets 6 and 15 divide the channels 2 and 3 into two continuous paths of flow, as will be seen by reference to Fig. 2, in which the channels 2 and 3 are shown schematically with reference to the member 1. Therefore, fluid entering the connection 7 will flow in a spiral path along the channel 2 and out through the outlet connection 9, while fluid forced through the connection 10 will flow in a spiral path in the reverse direction along the channel 3 and out through the connection 8.

This arrangement can be easily installed as the fluid flow conduit for a fluid cooled electron discharge device by attaching the proper inlet and outlet hose to the connection outlets.

The construction of this fluid flow conduit, being of compact and highly durable construction, overcomes the major difficulties encountered in the use of other types of fluid flow conduits.

While I have shown a preferred embodiment of my invention, I do not wish to be limited thereto except insofar as may be pointed out in the appended claims.

What I claim as new and desire to secure by Letters Patent of the United States, is:

1. A fluid flow conduit comprising, a cylindrical member having an exterior double helical channel, a casing adapted to enclose said cylindrical member, and a resilient material interposed between said member and said casing and helically formed in a manner adapted to maintain two independent lines of flow through said double helical channel.

2. A fluid flow conduit comprising, a cylindrical member composed of a ceramic material and exteriorly threaded, a cylindrical casing composed of a ceramic material and adapted to enclose said member, and a resilient gasket spirally interposed between said member and said casing in a manner adapted to define the exterior threads on said member in a continuous helical channel.

3. A fluid flow conduit comprising, a cylindrical member having a double helical channel, a casing adapted to enclose said double helical channel, and two gaskets helically positioned between, and co-extensive with, said double helical channel, said gaskets adapted to form a fluid-tight seal between said cylindrical member and said casing.

4. A fluid flow conduit comprising, a cylindrical member having two helical channels, an outlet connection for each of said channels at each end of said cylindrical member, a casing enclosing said cylindrical member, and two gaskets interposed between said cylindrical member and said casing in a manner adapted to enclose said helical channels to form two independent fluid-tight lines of flow.

5. A fluid flow conduit comprising, a cylindrical member composed of insulating material and having a double helical channel, a casing adapted to enclose said double helical channel, and a resilient insulating material interposed between said member and said casing and helically formed in a manner adapted to maintain two electrically independent lines of fluid flow through said double helical channel.

6. A fluid flow conduit comprising, a member having an exterior double helical channel, a casing adapted to enclose said member, and a resilient material interposed between said member and said casing and helically formed to maintain two independent lines of flow through said double helical channel.

7. A fluid flow conduit comprising, a member having a double helical channel, a casing adapted to enclose said double helical channel and two gaskets helically positioned between and co-extensive with said double helical channel, said gaskets forming a fluid-tight seal between said member and said casing.

ARTHUR M. TROGNER.